United States Patent [19]

Angelosanto et al.

[11] 4,432,679
[45] Feb. 21, 1984

[54] LOCK SPINDLE BLIND FASTENER FOR SINGLE ACTION APPLICATION

[75] Inventors: Donald J. Angelosanto; James W. Kendall, both of Huntington Beach, Calif.

[73] Assignee: Huck Manufacturing Company, Irvine, Calif.

[21] Appl. No.: 175,723

[22] Filed: Aug. 6, 1980

Related U.S. Application Data

[63] Continuation of Ser. No. 954,111, Oct. 24, 1978, abandoned, which is a continuation-in-part of Ser. No. 835,363, Sep. 21, 1977, Pat. No. 4,127,345.

[51] Int. Cl.³ .............................................. F16B 13/04
[52] U.S. Cl. ........................................ 411/34; 411/70
[58] Field of Search ...................... 411/34, 41, 43, 70

[56] References Cited

U.S. PATENT DOCUMENTS

| | | | |
|---|---|---|---|
| 2,061,628 | 11/1936 | Huck | 411/34 |
| 2,466,811 | 4/1949 | Huck | 411/34 X |
| 2,526,235 | 10/1950 | Huck | 411/43 |
| 2,887,003 | 5/1959 | Brilmyer | 411/34 |
| 3,047,181 | 7/1962 | Heidenwolf | 411/70 |
| 3,107,572 | 10/1963 | Orloff | 411/34 |
| 3,148,578 | 9/1964 | Gapp | 411/34 |
| 3,203,300 | 8/1965 | Marschner | 411/361 |
| 3,215,024 | 11/1965 | Brilmyer et al. | 411/361 |
| 3,277,771 | 10/1966 | Reynolds | 411/39 |
| 3,285,121 | 11/1966 | Siebol | 411/43 |
| 3,292,482 | 12/1966 | Fry et al. | 411/43 |
| 3,301,122 | 1/1967 | Wagner | 411/361 |
| 3,377,907 | 4/1968 | Hurd | 411/70 |
| 3,377,908 | 4/1968 | Stau et al. | 411/56 |
| 3,390,601 | 7/1968 | Summerlin | 411/43 |
| 3,461,771 | 8/1969 | Briles | 411/34 |
| 3,880,042 | 4/1975 | Binns | 411/43 |
| 3,915,055 | 10/1975 | Binns | 411/41 |
| 3,937,123 | 2/1976 | Matuschek et al. | 411/43 |
| 4,012,984 | 3/1977 | Matuschek | 411/34 |
| 4,112,811 | 9/1978 | King | 411/361 |

FOREIGN PATENT DOCUMENTS

| | | |
|---|---|---|
| 1413592 | 11/1975 | United Kingdom . |
| 1478934 | 7/1977 | United Kingdom . |
| 517709 | 8/1976 | U.S.S.R. . |

*Primary Examiner*—Thomas J. Holko
*Attorney, Agent, or Firm*—Harness, Dickey & Pierce

[57] ABSTRACT

A lock spindle blind fastener to be set with a single action tool where the fastener includes a pin or mandrel, a sleeve and a locking collar; the sleeve has an enlarged head which has a straight counterbore for the initial reception and guiding of the locking collar with the counterbore communicating with a bore portion having an entrant resistance angle for reception of the collar during setting. The entrant resistance angle is selected to be of a magnitude to provide hold-off of the locking collar. The strength of the mandrel and other characteristics of fastener components are related to the force required to deform the locking collar along the entrant resistance angle such that a high strength blind fastener is provided which can be set by a single action tool.

10 Claims, 11 Drawing Figures

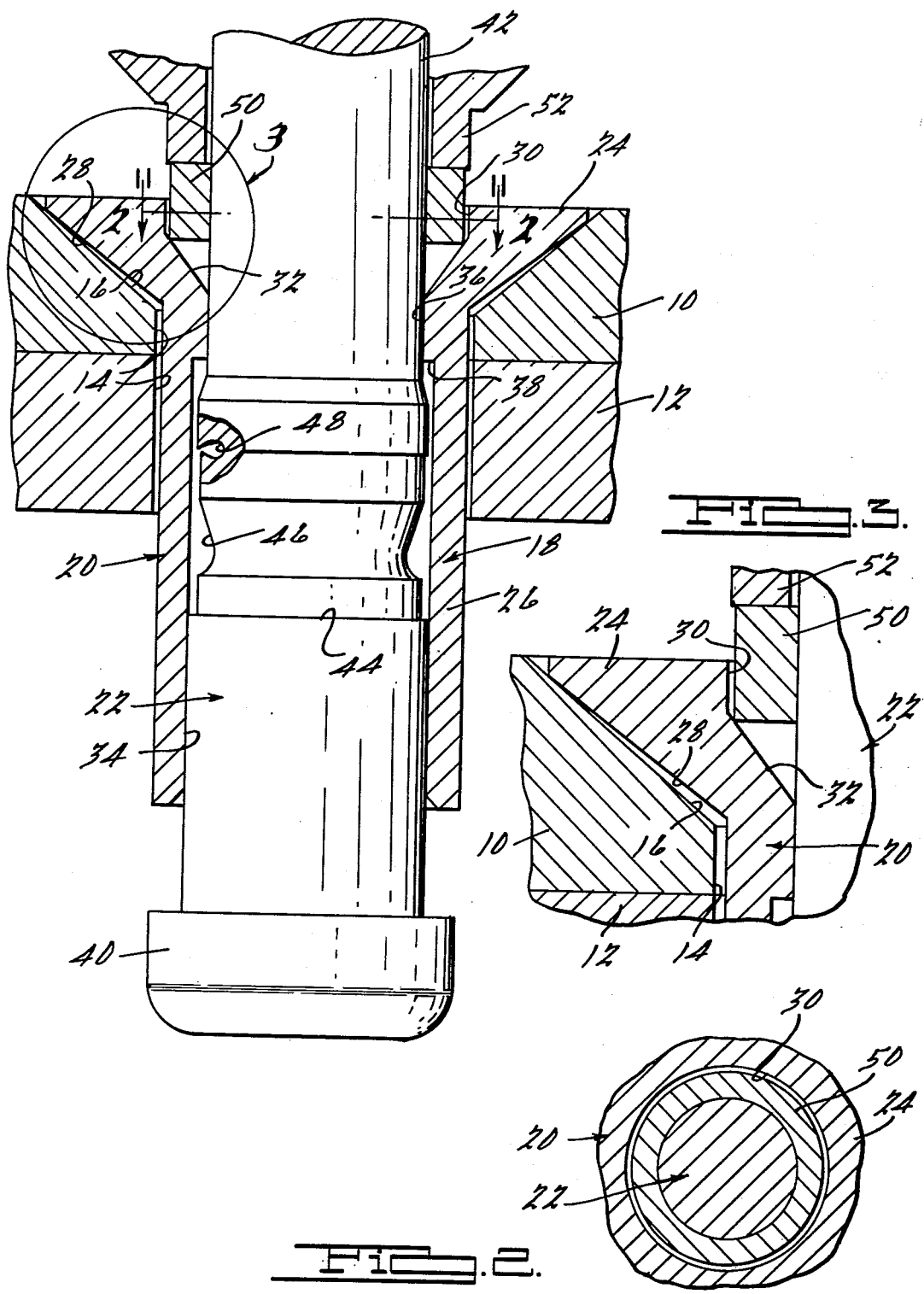

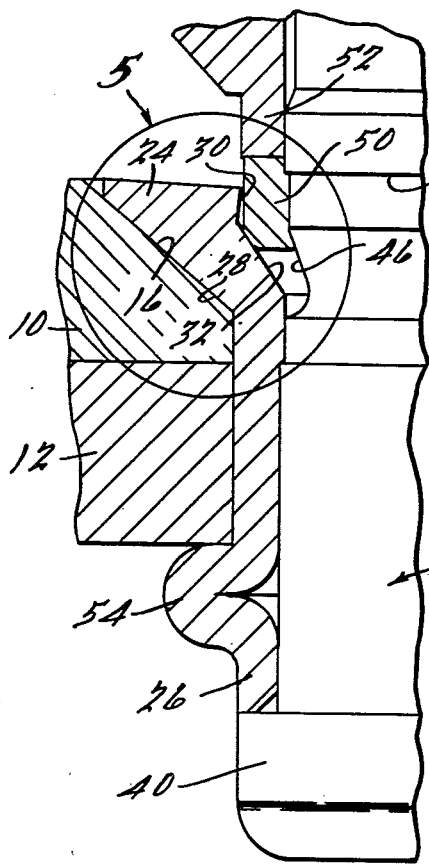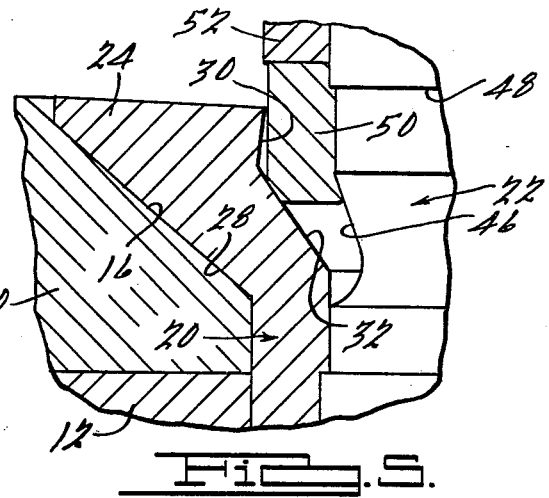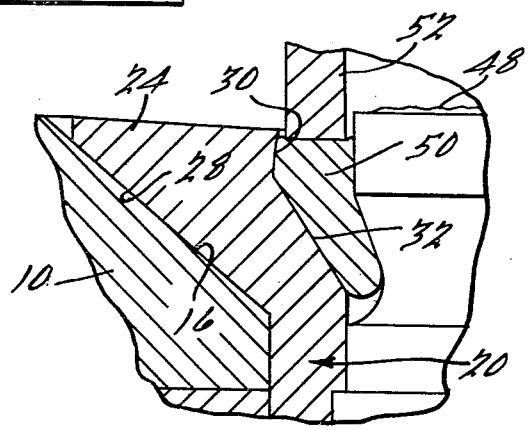

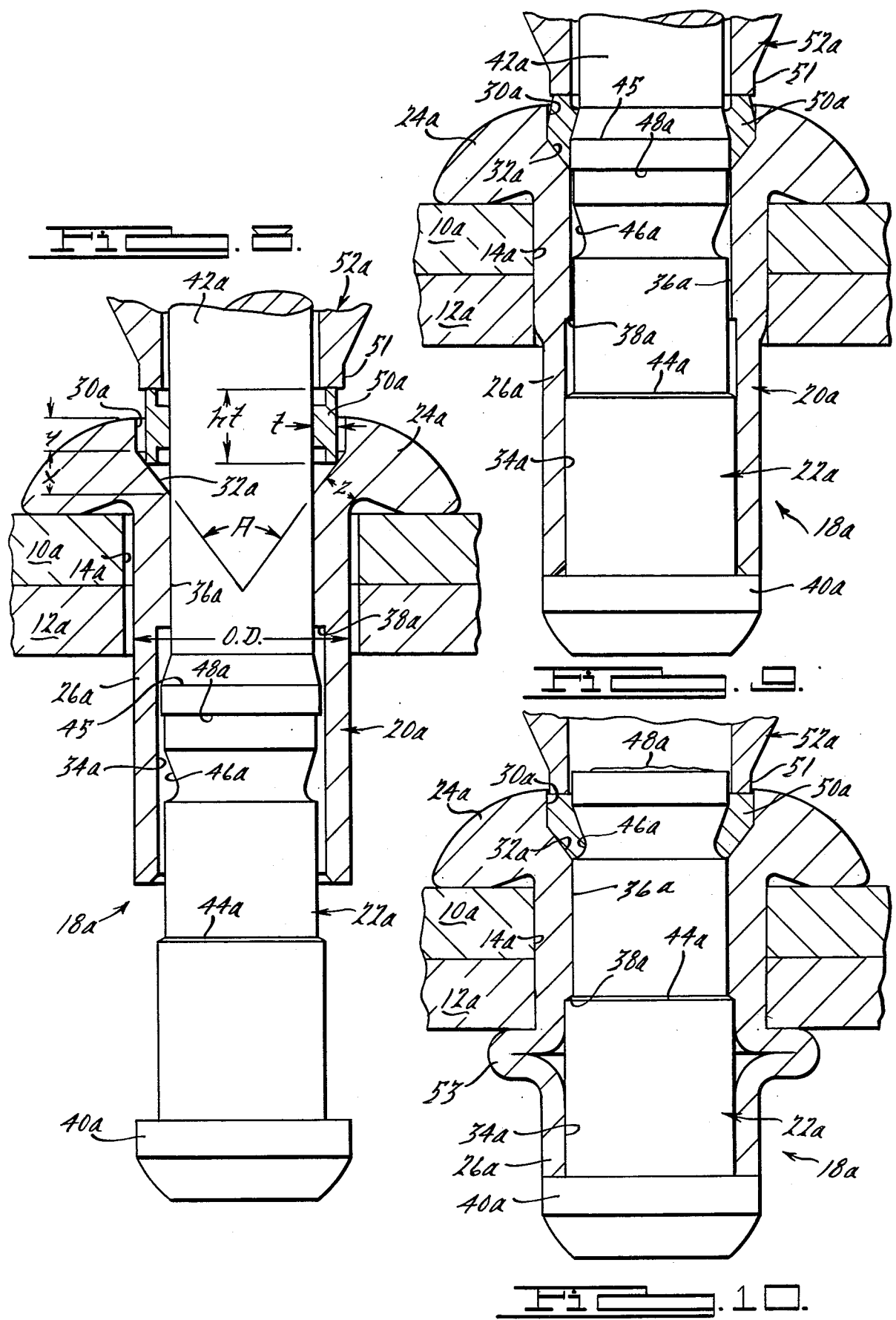

LOCK SPINDLE BLIND FASTENER FOR SINGLE ACTION APPLICATION

RELATED APPLICATIONS

This application is a continuation of Ser. No. 954,111, filed Oct. 24, 1978, now abandoned which in turn was a continuation in part of Ser. No. 835,363, filed Sept. 21, 1977, now U.S. Pat. No. 4,127,345 and is further related to copending, commonly assigned application Ser. No. 950,827, filed Oct. 12, 1978, now U.S. Pat. No. 4,230,017, the disclosures of which are hereby incorporated by reference.

SUMMARY—BACKGROUND OF THE INVENTION

The present invention relates to lock spindle blind fasteners and more particularly to lock spindle blind fasteners adapted to be set by a single action tool. Lock spindle blind fasteners, of the pull-type, are generally of two types; one in which the fastener is constructed to be set by a double-action tool and the other constructed to be set by a single action tool. The fastener of this invention is of this latter type. Both type of tools are generally well known in the fastener art.

Fasteners constructed to be set by a single action tool have had problems of load balance during different stages of setting the fastener including among other problems the supporting of the locking collar during the setting of the fastener which if not properly provided for can result in a malfunction in the final setting of the fastener. As a general rule these problems can be minimized if a fastener construction is utilized which requires low setting levels, i.e. relative force between pin and sleeve via the locking collar. As a result such fasteners have employed designs utilizing constructions requiring low setting loads. This has been accomplished in the past using constructions in which the mandrel and sleeve cooperate to provide tulip type head such as that shown in U.S. Pat. No. 3,915,055 issued Oct. 28, 1975 to L. S. Binns. A blind fastener having superior characteristics can be obtained where a mandrel and sleeve are used which cooperate to provide a bulbed head such as that shown in U.S. Pat. No. 2,061,628 issued Nov. 24, 1936 to L. C. Huck. One difficulty with bulbed head blind fasteners, however, is that the setting loads are considerably higher than those for a tulip type head.

In the present invention a fastener construction is provided in which a lock spindle blind fastener having a mandrel and sleeve constructed to cooperate to provide a bulbed head that can be set using a single action tool.

One form of a lock spindle blind fastener is shown and described in the parent case, Ser. No. 835,363 which case has claims directed to the solution of a problem with flush head fasteners; in that case the sleeve has a countersunk (flush) head configuration and a longitudinal, central tubular opening therethrough for the reception of the spindle or mandrel. The underside of the sleeve head is formed with an included angle of 106 degrees, plus or minus 2 degrees and is received within a countersunk hole of the workpiece in which the countersunk hole portion is conventionally 100 degrees, plus or minus 1 degree. There is thus an angular relationship between these facing surfaces of approximately 6 degrees from the outside in, before the fastener is set.

The longitudinal bore of the sleeve head has a straight-wall counterbore of approximately 0.015" and a communicating lock collar entry resistance angle of approximately 80 degrees.

The mandrel is received within the bore of the sleeve and has a head on its blind end adapted to engage the inner or blind end of the sleeve and form the blind head when the rivet is set, as in the prior art.

The mandrel is formed with a concealed break notch and a lock pocket, both known in the prior art.

A ring shaped lock collar embraces the projecting end of the mandrel and initially seats within the straight counterbore in the head of the sleeve. The projecting end of the lock collar is engaged by the nose of the setting tool and as the mandrel is pulled the reaction force of the nose presses the lock collar inwardly of the sleeve. The collar abuts against the entry resistance angle of the sleeve and movement into the lock pocket is restrained until the mandrel reaches the end of its pull stroke when the collar is forced into the lock pocket of the mandrel.

As will be seen the features of the present invention can be applied to fasteners having sleeves with flush or protruding head constructions; these features, many of which are disclosed in the noted parent case, are directed more to overall balancing of loads whereby an effective fastener design can be realized having high strength characteristics.

DESCRIPTION OF THE DRAWINGS

FIG. 1 is a vertical cross-sectioned view, with parts in elevation, of a fastener according to the present invention showing such fastener installed in pre-prepared openings in workpieces to be secured together and showing the lock-collar of the fastener engaged by the nose of an installation tool prior to setting, of the fastener;

FIG. 2 is a cross-sectioned view taken substantially along the line 2—2 of FIG. 1;

FIG. 3 is an enlarged view taken within the circle 3 of FIG. 1;

FIG. 4 is a partial view similar to FIG. 1 and showing the fastener in an intermediate stage in the setting;

FIG. 5 is an enlarged view within the circle 5 of FIG. 4;

FIG. 6 is a view similar to FIGS. 1 and 4 and showing the fastener as finally set;

FIG. 7 is an enlarged view within the circle 7 of FIG. 6;

FIG. 8 is an elevational view with some portions shown in section of a fastener prior to installation with the fastener including a mandrel, a sleeve and a locking collar, all of which are preassembled and located in aligned openings through workpieces to be fastened together;

FIG. 9 is a view similar to FIG. 8 depicting the fastener at an intermediate stage in the installation;

FIG. 10 is a view similar to FIGS. 8 and 9 depicting the fastener in its final set condition.

Figure 11:
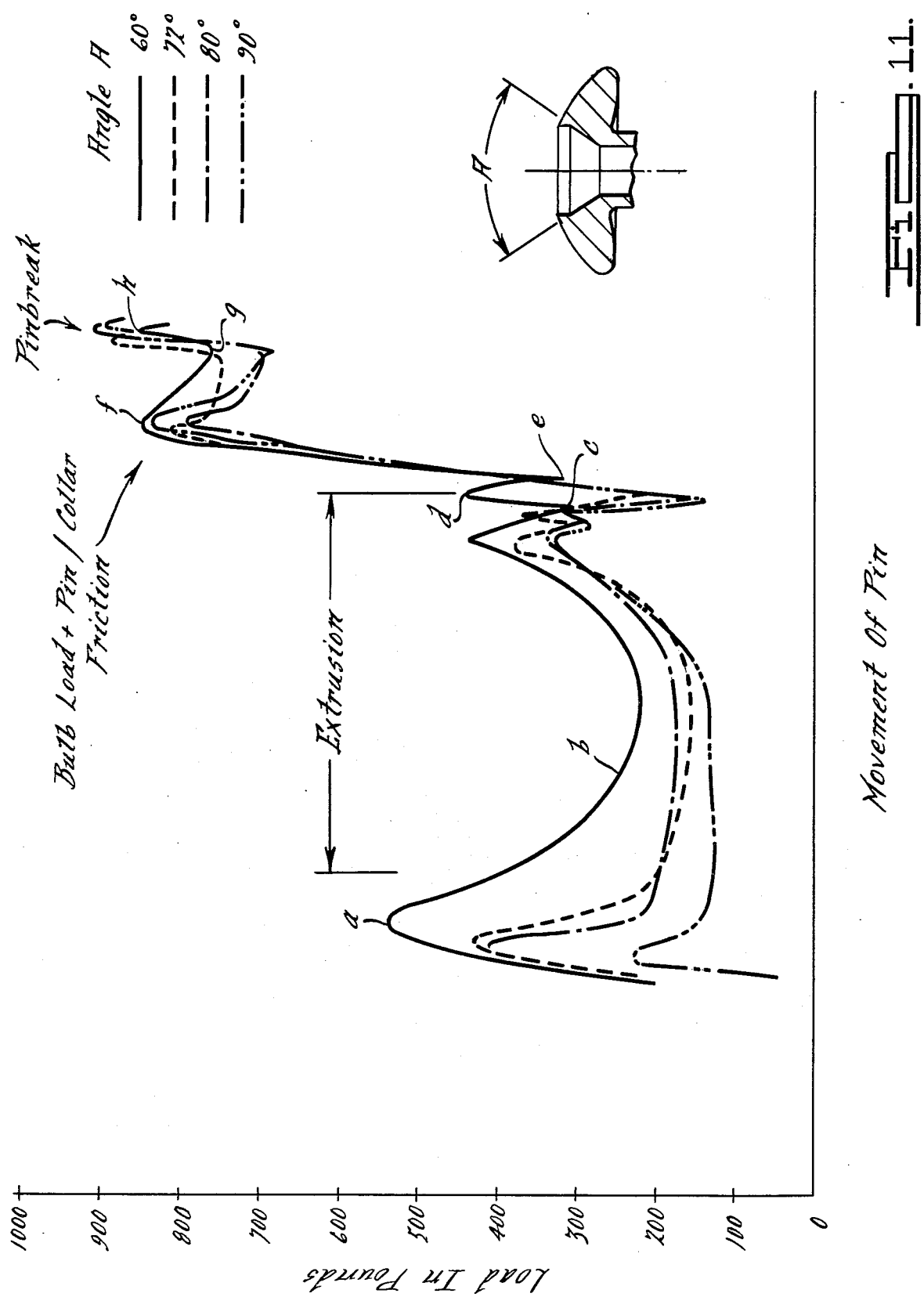
FIG. 11 is a graphical presentation of the load in pounds as applied between the pin and sleeve (via the locking collar) of the fastener versus the movement of the pin for different entry resistance angles.

The mandrel 22 is disposed within the sleeve 20 for longitudinal movement therein and is formed with an annular head 40 at its inner end which is adapted to abut the inner end of the sleeve 20 in the formation of the blind head.

The opposite end of the mandrel projects beyond the head of the sleeve as indicated at 42. The projecting end is adapted to be engaged by a pull gun in the usual way. The mandrel 22 is formed with an annular shoulder 44 which provides a stop shoulder adapted to abut the cooperating stop shoulder 38 on the sleeve to thus limit the movement of the mandrel 22.

An annular lock pocket 46 is also formed in the mandrel between the stop shoulder 44 and a concealed or closed annular break notch 48. Such break notch is disclosed in Fry U.S. Pat. No. 3,292,482. An annular ring shaped lock collar 50 embraces the mandrel and is disposed within the counterbore 30. The engagement between the wall of the counterbore 30 and the surface of the lock collar assures that the lock collar will be held in straight alignment during the setting of the fastener.

The sequence of operation in the setting of the fastener are shown in the comparison of FIGS. 1, 4 and 6 and their related enlarged sections.

In FIG. 1 the fastener 18 is shown as having been inserted in the openings 14 with the countersunk head 24 substantially flush with the outer surface of the part or panel 10 and wth the under surface 28 adjacent and facing the countersink 16.

The outer end of the lock collar is engaged by the abutting end of a nose piece 52 of a conventional, single action, pull-type installation tool. Only the nose portion of such installation tool is illustrated but its construction and function are well known in the art. Generally speaking, the projecting end 42 of the mandrel is engaged within the installation tool to pull the mandrel and applying a reaction force against the lock collar 50 by the abutting nose piece 52.

In the initial position, as best illustrated in the enlarged FIG. 3, the under surface of the countersunk head 28 is only in annular engagement with the countersink surface 16 adjacent the outer end, there being a space between such surfaces adjacent the inner end due to the difference in the included angles of each surface.

The lock collar 50 is received within the straight counterbore 30 and while in the illustration a slight spacing is shown, the fit is such that in the setting operation the collar 50 is supported by the wall of such counterbore 30 and embraces the mandrel 22. The inner end of the collar thus rests against the angular wall 32.

Referring to FIGS. 4 and 5, an intermediate stage in the setting sequence is illustrated. At this stage the mandrel 22 has been pulled and the nose 52 has reacted to push the lock collar inwardly. Also at this stage, the blind bulbed head 54 has been formed and the stop shoulder 44 has abutted the shoulder 38. The angular surface 42 has resisted the inward movement of the collar so as to hold-off premature locking by the collar 50.

As the pull on the mandrel continues, with a build-up in the reaction force of the nose 52 against the lock collar, the lock collar is forced into the lock pocket 46. More importantly, as this setting continues the head 24 of the sleeve is reformed so that the surface 28 is reformed into full annular contact with bore 16 throughout their lengths; and at the same time, the head is also deflected to cause a back taper of the counterbore 30 of about 3°.

The effect of such movement is best shown by comparison of the enlarged FIGS. 3, 5, and 7 where it will be seen that the surfaces 16 and 28 are in full peripheral engagement throughout the length of the counterbore and also that the wall 30 which has been straight has in effect been hooked over the outer end of the lock collar 50 because of the back taper. The collar 50 has been reshaped in being forced into the lock pocket as best shown in FIGS. 5 and 7. The lock collar has thus been additionally locked against outward displacement.

The embodiment of FIGS. 8-10 depict the sequence of setting a fastener embodying features of the present invention. Thus in the description of the elements of FIGS. 8-10 components similar to like components in the embodiment of FIGS. 1-7 have been given the name numerical designation with the addition of the postscript letter "a".

Referring now to FIGS. 8-10 workpieces 10a and 12a having aligned openings 14a are to be secured together by a fastener 18a. The fastener 18a is a three piece construction and includes a tubular sleeve 20a (adapted to be located in clearance relationship in opening 14a), a pin or mandrel 22a and a locking collar 50a. The sleeve 20a includes an enlarged, protruding head 24a which is integral with a longitudinally extending, straight shank section 26a. The locking collar 50a is preferably of a corrugated construction of the type shown and described in the copending, commonly assigned patent application Ser. No. 950,827, supra.

The head 24a has a straight wall counterbore 30a which communicates with a conically shaped, annular entry resistance angle portion 32a. The shank section 26a has a central through bore 34a which communicates at its inner end with a reduced diameter cylinder portion 36a and which defines therewith an annular stop shoulder 38a.

The pin or mandrel 22a is located within the sleeve 20a and adapted to be moved longitudinally therein; an enlarged head 40a is formed on the inner end of the mandrel 22a and is adapted to engage the inner end of the shank section 26a to form a blind, bulbed head in the manner to be shown (see FIGS. 9 and 10).

The outer end 42a of the mandrel 22a is of a reduced diameter and extends beyond the head 24a of the sleeve 20a and is adapted to be engaged in a conventional manner by a pull gun (not shown) having an anvil 52a which operates in a manner to be described.

The mandrel 22a has an annular shoulder 44a at a preselected location which is adapted to engage the sleeve stop shoulder 38a to limit the movement of mandrel 22a. An annular lock pocket 46a is formed on the mandrel 22a between the pin shoulder 44a and a concealed or closed annular breakneck or notch 48a. An enlarged, annular extruding land 45 is located adjacent to and at a selected distance forward of the breakneck 48a. The extruding land 45 is of a size slightly smaller than that of bore 34a and larger than the bore of cylindrical portion 36a. Thus as the mandrel 22a is moved longitudinally through the sleeve 20a the extruding land 45 will engage the cylindrical portion 36a to provide filling of the aligned openings 14a of workpieces 10a and 12a.

The lock ring or collar 50a is adapted to engage the reduced diameter portion 42a and also to fit within the counterbore 30a. The anvil 52a is provided with an elongated, annular nose portion 51 which is adapted to engage the lock collar 50a.

The sequence of operation of setting the fastener 18a can be seen in FIGS. 8-10. FIG. 8 shows the three pieces of the fastener 18a assembled together, prior to setting, and being located in the openings 14a of workpiece 10a and 12a. FIG. 9 shows the fastener 18a after the mandrel 22 has been partially moved through the sleeve 20a until the enlarged pin head 40a engages the inner end of the sleeve 20a. At this position bulbing of the inner end of the sleeve 20a has not yet occurred but the extruding land 45 has completed its movement through the cylindrical portion 36a, performing the hole filling operation and has extended into the lock collar 50a and has partially extruded the lock collar 50a. FIG. 10 shows the fastener 18a after it has been finally set. Looking to FIG. 10, a bulbed head 53 has been formed at the rearward surface of the inner workpiece 12a and relative movement between the mandrel 22a and the sleeve 20a has ceased as the annular pin shoulder 44a engages the sleeve stop shoulder 38a. As this occurs the nose portion 51 of anvil 52a forces the material of the lock ring 50a into the cavity defined by the confronting surfaces of the lock pocket 46a and counterbore 30a and entry angle portion 32a.

While it is desirable with the fastener 18a that the strength be maximized for the materials used, it is also desirable that the material of the pin 22a be similar to that of the sleeve 20a and still be able to function despite the frictional forces caused by pinching of the pin 22a by the lock collar 50a. This can be accomplished with the fastener 18a. The objective, of course, is to provide a fastener 18a in which all of the functions in setting the fastener are performed at as low loads as possible such that the bulbing load can be maintained as low as possible considering the added frictional loads. With the fastener 18a, however, the inherent high load required to provide the desired bulbed head creates problems when the frictional forces resulting from the use of a single action tool are taken into consideration.

Thus with the relative force as applied between pin 22a and sleeve 20a actually being applied to the sleeve 20a solely through the locking ring 50a some frictional force will occur between the ring 50a and the pin 22a increasing the application load levels. The magnitude of frictional load is a function of the magnitude of entry resistance angle A of portion 32a. In general as the angle A decreases the hold off capability of the lock collar 50a decreases and the frictional loads increase. On the other hand as the angle A increases the hold off capability increases but at the same time the load required to move the material of the lock collar 50a into the lock pocket 46a increases. FIG. 11 depicts a series of load curves for fasteners such as 18a having different entry resistance angles A; in FIG. 11 the X-axis; or abscissa, is plotted in terms of movement of the pin and the Y-axis, or ordinate, is plotted in terms of relative load between the pin 22a and sleeve 20a. The first load peak 'a' occurs as extrusion and radial expansion of the cylindrical portion 36a is initiated via the engagement of the extruding land 45 with stop shoulder 48a. As extrusion continues the load drops off to level 'b'. Without the lock collar 50a present the load level 'b' would drop considerably below the level shown; thus the level 'b' is attributable to a large extent to pin/collar friction. The load drops to a level 'c' at the conclusion of extrusion and radial expansion and then increases again to level 'd' as the extruding land 45 enters the lock ring 50a. Subsequently the load drops to level 'e' which is generally the condition of the fastener shown in FIG. 9. Without the load being applied to the lock collar 50a the load level 'e' would be considerably less i.e. near zero. The magnitude of level 'e' represents the retained frictional force. This frictional force component is seen by the pin 22 a and hence by the breakneck 48a. The breakneck 48a will break at a preselected load which can be determined by the material of the pin 22a. The pin 22a, however, still has more work to perform since the blind, bulbed head 53 has yet to be formed. This occurs when the relative axial load increases to load level 'f'. As the bulbed head is formed the load drops off to level 'g' at which time the pin shoulder 44a engages the sleeve stop shoulder 38a and relative movement ceases and the load increases to pin break at point 'h'. Note that the frictional load caused by pin/collar friction is additive to the load required to form the bulbed head and hence this frictional load increases the total load on the pin 20a to cause bulbing. This decreases the difference in magnitude between points 'f' and 'h'. Unless a suitable difference is maintained premature pin break can occur resulting in an improperly set fastener. The curves of FIG. 11 show that where the resistance angle A was 60°, the points 'f' and 'h' were too close and hence could result in fasteners having premature pin break. The same is true when the angle A approaches 90°. With the 60° angle the lock collar 50a provides little hold off and almost immediately applies a high frictional force on the pin 22a. With the 90° angle the lock collar 50a is initially held off from the pin 22a keeping the initial frictional loads low. However, as the load on the lock collar 50a increases the lock collar 50a is deformed or squashed radially inwardly. This results in an increase in the frictional force between pin 22a and the lock collar 50a and at the same time the lock collar 50a is not moved as effectively down the surface of the entrance angle portion 32a into the lock cavity resulting in a less desirable lock between the pin 22a and the sleeve 20a. Thus it has been determined that the entrance angle A should be in a range of approximately 65° to 85° with the preferred angle A being around 72°.

Note that the lock collar 50a is held in assembled relationship about the pin 22a and is in clearance relationship relative to the straight counterbore 30a. The counterbore 30a is provided not only to assist alignment of the lock collar 50a but also to provide containment thereof. Thus the axial depth x of the resistance angle portion 32a is held uniform while the axial depth y of the counterbore 30a is varied. If the counterbore 30a were omitted and the angle portion 32i a simply extended out to the head 24a an excessively large cavity would result and the movement of the material of the lock ring 50a would not be controlled or contained (see FIG. 9 where the effect of containment can be seen).

The entry angle portion 32a defines a generally uniform, straight surface. This facilitates driving the lock collar 50a into the locking cavity defined by the lock pocket 46a and confronting surface of the entry angle portion 32a and straight bore 30a. If a double angle were utilized such that a smaller angle A were provided at the inner extremity of the angle portion 32a this would result in a larger cavity (requiring a greater volume of lock collar 50a) and would also result in a reduction in the strength of the head 24a in a plane shown as "z" in FIG. 8.

The nose portion 51 is of a dimension to fit within the straight, counterbore 30a. Thus in setting the lock collar 50a the nose portion 51 can extend into counterbore 30a to whatever extent is required to assure that the material of the lock ring 50a will be moved into the lock cavity thus assuring a good lock.

It is advantageous to maintain the diameter of the counterbore 30a to a minimum in order to minimize the volume of material of lock collar 50a. Thus it has been found desirable to provide a lock collar 50a having a thickness which is in a ratio to the outside diameter 'O.D.' of shank 26a of around 0.11. At the same time the height 'ht' of the collar 50a has a ratio to the outside diameter 'O.D.' of around 0.35; for a straight ring, non-corrugated lock collar this ratio would be reduced accordingly. The diameter of the counterbore 30a (and hence the maximum diameter of the entry angle portion 32a) is only slightly larger than the outside diameter of the lock collar 50a whereby the desired confinement results and in addition the size and volume of the lock collar 50a can be minimized.

With the structure as shown and described a more efficient and economical utilization of materials can be realized. For example an aluminum pin can be used with an aluminum sleeve since the loads on the pin can be carefully controlled. The same is true for other materials whereby pins and sleeves can be made of similar materials, without the necessity for utilization of more expensive high strength materials.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastener system including a blind fastener and a single action tool for securing together a plurality of workpieces with said blind fastener having a tubular sleeve, an elongated pin adapted to be located within the sleeve for the relative movement therewith, and a lock collar adapted to be moved into locking engagement between said sleeve and said pin and with the fastener adapted to be set by said single action tool, said tool having an anvil engaging said lock collar whereby the force for setting the fastener is applied substantially solely between said pin and said lock collar, the improvement comprising: said sleeve having a straight shank portion terminating in an enlarged head portion at one end and having an axially extending bore, said pin having an elongated shank section terminating in an enlarged head structure at one extremity and being adapted to be located within said axial bore with said head structure located at the opposite end of said shank portion of said sleeve and to engage said opposite end upon application of a relative axial force between said pin and said sleeve for forming a bulbed head at said opposite end, said sleeve having an enlarged straight counterbore located in said enlarged head which counterbore is connected to said axial bore via a straight, tapered entry resistance angle portion, said resistance angle portion defining an included angle of from around 65° to around 85°, said lock collar being generally annular and located around said shank section and adapted to be located within said counterbore and seated against said resistance angle portion, said lock collar having an outer shape such that it is in clearance relationship with the outer surface of said enlarged head surrounding said counterbore whereby the setting force for the entire setting cycle is applied from the anvil to said resistance angle portion through said lock collar, said pin having a lock pocket on said shank section which when located in confrontation with said resistance angle portion defines a lock cavity, said anvil having an annular, elongated nose portion engageable with said lock collar whereby all of the setting loads are applied between said pin and said lock collar; said counterbore confining said lock collar as it is deformed by the relative force applied to said lock collar between said nose portion and said resistance angle portion and guiding the movement of said lock collar as it is moved into said lock cavity by said nose portion, said nose portion being of a diameter less than that of said counterbore and being of sufficient length to move substantially axially within said counterbore without engagement of said anvil with said sleeve whereby packing of said lock cavity with said lock collar is facilitated, said pin having a breakneck groove located on said shank portion at a position proximate said enlarged head portion and adapted to fracture thereat after formation of said bulbed head and setting of said lock collar.

2. In a fastener system including a blind fastener and a single action tool for securing together a plurality of workpieces with said blind fastener having a tubular sleeve, an elongated pin adapted to be located within the sleeve for relative movement therewith, and a lock collar adapted to be moved into locking engagement between said sleeve and said pin and with the fastener adapted to be set by said single action tool, said tool having an anvil engaging said lock collar whereby the force for setting the fastener is applied substantially solely between said pin and said lock collar, the improvement comprising: said sleeve having a straight shank portion adapted to be located in aligned openings in the workpieces terminating in an enlarged head portion at one end and having an axially extending bore, said pin having an elongated shank section terminating in an enlarged head structure at one extremity and being adapted to be located within said axial bore with said head structure located at the opposite end of said shank portion of said sleeve and to engage said opposite end upon application of a relative axial force between said pin and said sleeve for forming a bulbed head at said opposite end, said sleeve having an enlarged straight counterbore located in said enlarged head which counterbore is connected to said axial bore via a straight, tapered entry resistance angle portion, said resistance angle portion defining an included angle of from around 65° to around 85°, said lock collar being generally annular and located to embrace said shank section and adapted to be located within said counterbore and seated against said resistance angle portion, said lock collar having an outer shape such that it is in clearance relationship with the outer surface of said enlarged head surrounding said counterbore whereby the setting force for the entire setting cycle is applied from the anvil to said resistance angle portion through said lock collar, said pin having a lock pocket on said shank section which when located in confrontation with said resistance angle portion defines a lock cavity, said anvil having an annular, elongated nose portion engageable with said lock collar whereby all of the setting loads are applied between said pin and said lock collar; said counterbore confining said lock collar as it is deformed by the relative force applied to said lock collar between said nose portion and said resistance angle portion and guiding the movement of said lock collar as it is moved into said lock cavity by said nose portion, said nose portion being of a diameter less than that of said counterbore and being of sufficient length to move substantially axially within said counterbore without engagement of said anvil with said sleeve whereby packing of said lock cavity with said lock collar is facilitated, said bore in said straight shank portion of said sleeve having a reduced diameter bore portion adjacent said head portion and an enlarged diameter bore portion at said opposite end, a stop shoulder being defined by the junction of said bore portions, said shank section of said pin having an enlarged extruding land portion adapted to engage a portion of said stop shoulder and to radially expand said shank portion in the area of said reduced diameter bore portion to provide filling of the openings in the workpieces, said extruding land portion located a distance from said pin head structure such that it will engage and substantially extrude said lock collar prior to formation of said bulbed head, said pin having a stop land on said shank section at a preselected distance from said head structure, said pin having a breakneck groove located on said shank portion at a position proximate said enlarged head portion and adapted to fracture thereat after formation of said bulbed head and setting of said lock collar and engagement of said stop land with said stop shoulder.

3. The fastener system of claim 2 in which the material of said sleeve and of said pin are similar whereby pin break will occur at a magnitude of load proximate to the load required for bulbing.

4. The fastener system of claim 2 in which said counterbore is of a minimum diameter as determined by said lock collar having a thickness which is in a ratio of around 0.11 to the outside diameter of said sleeve shank portion.

5. The fastener system of claim 4 in which said lock cavity is of a minimum volume as determined by said lock collar thickness and further as determined by said lock collar being of an internally corrugated construction and having a height which is in a ratio of around 0.35 to the outside diameter.

6. In a fastener system including a blind fastener and a single action tool for securing together a plurality of workpieces, said blind fastener having a tubular sleeve, an elongated pin adapted to be located within the sleeve for relative movement therewith, and a lock collar adapted to be moved into locking engagement between said sleeve and said pin and with the fastener adapted to be set by said single action tool having an anvil engaging said lock collar whereby the force for setting the fastener is applied substantially solely between said pin and said lock collar, the improvement comprising: said sleeve having a straight shank portion adapted to be located in aligned openings in the workpieces and terminating in an enlarged head portion at one end and having an axially extending bore, said pin having an elongated shank section terminating in an enlarged head structure at one extremity and being adapted to be located within said axial bore with said head structure located at the opposite end of said shank portion of said sleeve and to engage said opposite end upon application of a relative axial force between said pin and said sleeve for forming a bulbed head at said opposite end, said sleeve having an enlarged straight counterbore located in said enlarged head which counterbore is connected to said axial bore via a straight, tapered entry resistance angle portion, said resistance angle portion defining an included angle of from around 65° to around 85°, said lock collar being generally annular and located to embrace said shank section and adapted to be located within said counterbore and seated against said resistance angle portion, said anvil having an annular, elongated nose portion engageable with said lock collar whereby all of the setting loads are applied between said pin and said lock collar, said lock collar having an outer shape such that it is in clearance relationship with the outer surface of said enlarged head surrounding said counterbore whereby the setting force for the entire setting cycle is applied from the anvil to said resistance angle portion through said lock collar, said pin having a lock pocket on said shank section which when located in confrontation with said resistance angle portion defines a lock cavity, said counterbore confining said lock collar as it is deformed by the relative force applied to said lock collar between said elongated nose portion and said resistance angle portion and guiding the movement of said lock collar as it is moved into said lock cavity by said anvil, said nose portion being of a diameter less than that of said counterbore and being of sufficient length to move substantially axially within said counterbore without engagement of said anvil with said sleeve whereby packing of said lock cavity with said lock collar is facilitated, said bore in said straight shank portion of said sleeve having a reduced diameter bore portion adjacent said head portion and an enlarged diameter bore portion at said opposite end, a stop shoulder being defined by the juncture of said bore portions, said shank section of said pin having an enlarged extruding land portion adapted to engage a portion of said stop shoulder and to radially expand said shank portion in the area of said reduced diameter bore portion to provide filling of the openings in the workpieces, said extruding land portion located a distance from said pin head structure such that it will engage and substantially extrude said lock collar prior to formation of said bulbed head, said pin having a stop land on said shank section at a preselected distance from said head structure, said pin having a breakneck groove located on said shank portion at a position proximate said enlarged head portion and adapted to fracture thereat after formation of said bulbed head and setting of said lock collar and engagement of said stop land with said stop shoulder.

7. The fastener system of claim 6 in which the material of said sleeve and of said pin are similar whereby pin break will occur at a magnitude of load priximate to the load required for bulbing.

8. The fastener system of claim 6 in which said counterbore is of a minimum diameter as determined by said lock collar having a thickness which is in a ratio of around 0.11 to the outside diameter of said sleeve shank portion.

9. The fastener system of claim 8 in which said lock cavity is of a minimum volume as determined by said clock collar thickness and further as determined by said lock collar having an internally corrugated construction and having a height which is in a ratio of around 0.35 to the outside diameter.

10. In a fastener system for securing together a plurality of workpieces with a blind fastener having a tubular sleeve, an elongated pin adapted to be located within the sleeve for relative movement therewith, and a lock collar adapted to be moved into locking engagement between said sleeve and said pin and with the fastener adapted to be set by a single action tool having an anvil engaging said lock collar whereby the force for setting the fastener is applied substantially solely between said pin and said lock collar, the improvement comprising: said sleeve having a straight shank portion terminating in an enlarged head portion at one end and having an axially extending bore, said pin having an elongated shank section terminating in an enlarged head structure at one extremity and being adapted to be located within said axial bore with said head structure located at the opposite end of said shank portion of said sleeve and to engage said opposite end upon application of a relative axial force between said pin and said sleeve for forming a bulbed head at said opposite end, said sleeve having an enlarged straight counterbore located in said enlarged head which counterbore is connected to said axial bore via a straight, tapered entry resistance angle portion, said resistance angle portion defining an included angle of around 80°; said lock collar being generally annular and located around said shank section and adapted to be located within said counterbore and seated against said resistance angle portion, said lock collar having an outer shape such that it is in clearance relationship with the outer surface of said enlarged head surrounding said counterbore whereby the setting force for the entire setting cycle is applied from the anvil and to said resistance angle portion through said lock collar, said pin having a lock pocket on said shank section which when located in confrontation with said resistance angle portion defines a lock cavity, said anvil having an annular, elongated nose portion engageable with said lock collar whereby all of the setting loads are applied between said pin and said lock collar; said counterbore confining said lock collar as it is deformed by the relative force applied to said lock collar between said nose portion and said resistance angle portion and guiding the movement of said lock collar as it is moved into said lock cavity by said nose portion, said nose portion being of a diameter less than that of said counterbore and being of sufficient length to move substantially axially within said counterbore without engagement of said anvil with said sleeve whereby packing of said lock cavity with said lock collar is facilitated, said pin having a breakneck groove located on said shank portion at a position proximate said enlarged head portion and adapted to fracture thereat after formation of said bulbed head and setting of said lock collar.

* * * * *

UNITED STATES PATENT AND TRADEMARK OFFICE
CERTIFICATE OF CORRECTION

PATENT NO. : 4,432,679

DATED : February 21, 1984

INVENTOR(S) : Donald J. Angelosanto & James W. Kendall

It is certified that error appears in the above-identified patent and that said Letters Patent are hereby corrected as shown below:

After "References Cited FOREIGN PATENT DOCUMENTS" insert --1,906,989 2/1973 W. Germany--
Column 3, line 24, delete "wth" and substitute therefor --with--.
Column 5, line 68, delete "22 a" and substitute therefor --22a--.
Column 6, line 44, delete "32i a" and substitute therefor --32a--.
Column 7, Claim 1, line 32, delete "the" second occurrence.
Column 10, Claim 9, line 48, delete "clock" and substitute therefor --lock--.
Column 11, Claim 10, line 15, delete "and".

Signed and Sealed this

Twenty-fourth Day of April 1984

[SEAL]

Attest:

GERALD J. MOSSINGHOFF

Attesting Officer

Commissioner of Patents and Trademarks